March 4, 1941.  R. A. ANDERSON ET AL  2,234,161

WINDSHIELD WIPER

Filed March 20, 1939

INVENTORS.
John E. Reeve.
Richard A. Anderson.
BY Geo. Stevens ATTORNEY.

Patented Mar. 4, 1941

2,234,161

UNITED STATES PATENT OFFICE 2,234,161

WINDSHIELD WIPER

Richard A. Anderson and John E. Reeve, Duluth, Minn.

Application March 20, 1939, Serial No. 262,871

1 Claim. (Cl. 15—250.5)

Our invention relates to windshield wipers and the principal object thereof is to provide means for more efficiently heating a device of this type, and one that will more readily clean the windshield when ice or sleet forms thereupon.

Another object is to provide simple means whereby air circulates through the wiper by virtue of its back and forth action.

Still other objects and advantages of the invention will appear in the following description thereof.

Referring now to the accompanying drawing, forming part of this application, and wherein like reference characters indicate like parts:

Figure 1:
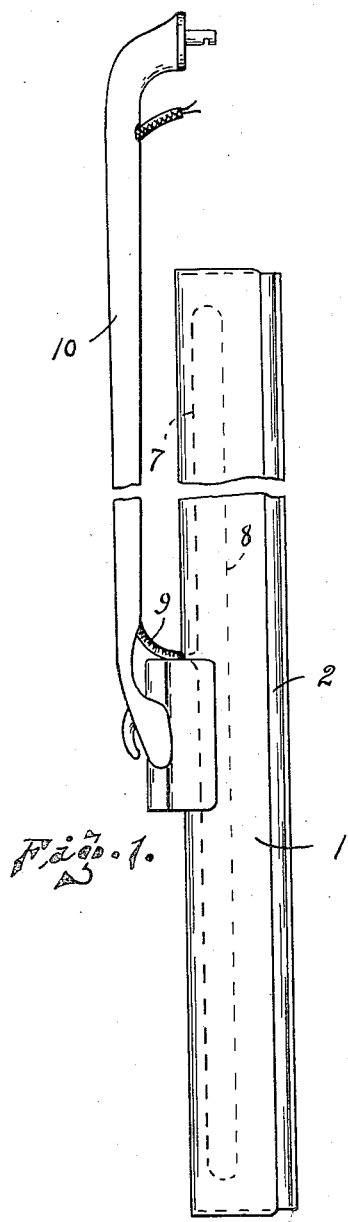
Figure 1 is a side elevation of one embodiment of the invention as completely assembled.

In the drawing, 1 represents a sheet metal tubular housing member, preferably of somewhat pear shape in cross section, and split or open upon its narrow face for the reception of the bifurcated body portion of the wiping or glass engaging member 2. The housing portion 1 is provided with closed end portions 3 and is preferably lined with some heat resisting material such as asbestos paper, or the like, indicated at 4, the same occurring intermediate of the body portion 5 of the resilient member 2.

Figure 2:
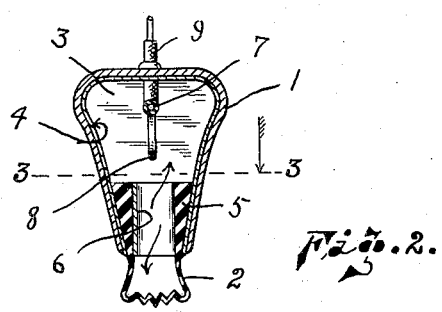
Figure 2 is a transverse section of the wiper, somewhat enlarged.
Figure 3:
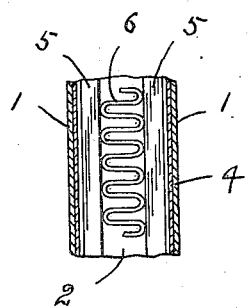
Figure 3 is a section on the line 3—3, Figure 2.

The opposite sides of the body portion 5 of the member 2 are preferably of somewhat wedge shape as clearly shown in Figure 2 and spaced sufficiently far apart to receive a pervious spacing member 6 which is in the form of a corrugated strip of metal and through which corrugations the air readily circulates to and from the interior portions of both members 1 and 2. While both ends of the member 2 may be left open, in the preferred construction the upper end of same is closed so as to prevent moisture gathering therein or passing therethrough, as well as causing a positive current of air to and from same and thus more positively insuring circulation of air through the entire wiping member.

Within the tubular member 1 is installed the heating element consisting of the insulated wire indicated at 7 extending in the form of a loop throughout the interior of the member 1 with preferably the lower portion thereof as indicated at 8 being the smaller so as to more readily heat by the current of electricity passing therethrough, which is common in similar devices. The lead of the heating element is indicated at 9 and passes upwardly through the flattened wall of the tube 1 and may be installed within the wiper arm 10 as clearly indicated in Figure 2 of the drawing.

It is to be noted that the lowermost glass engaging portion of the wiper is of rubber and the portions 2 and 5 preferably integral, with the former being somewhat bellows-like in shape and susceptible of readily yielding when passing from one position to the other upon the glass, causing the pumping or circulating effect of the air therein during such action, which materially assists in the circulation of the air therein, bringing the warmer air from the interior of the housing 1 to the member 2.

Furthermore it is to be understood that the assembly of the body portion 5 of the member 2 with the spacer 6 therebetween is of sufficient transverse dimension to cause the spaced termini of the member 1 to adequately pinch same, and hold the various parts in position, and that the shape of the back of the wiper is such as to accommodate the ordinary holding clip provided with such on the operating arm of the wiper.

Having thus described our invention, what we claim and desire to secure by Letters Patent, is:

A windshield wiper comprising a hollow split member having closed ends defining a principal chamber, a hollow flexible wiping member extending from said first mentioned member and having unobstructed communication with said chamber, the entire length thereof, said wiping member being open longitudinally of one wall thereof forming two spaced wedge shaped walls for holding engagement within the split portion of said first mentioned hollow member, a pervious spacer element intermediate of said wedge shaped walls, and heating means within said principal chamber.

RICHARD A. ANDERSON.
JOHN E. REEVE.